United States Patent [19]
Rosenberg

[11] Patent Number: 4,825,456
[45] Date of Patent: Apr. 25, 1989

[54] TELEPHONE SYSTEM/PAGING SYSTEM INTERFACE

[76] Inventor: Maury Rosenberg, 9 Hinton St., Staten Island N.Y. 10312

[21] Appl. No.: 142,530

[22] Filed: Jan. 7, 1988

[51] Int. Cl.[4] .............................................. H01Q 7/00
[52] U.S. Cl. ......................................... 379/57; 379/63
[58] Field of Search ..................... 379/57, 63, 61, 56, 379/58; 340/825.44

[56] References Cited

U.S. PATENT DOCUMENTS

| | | | |
|---|---|---|---|
| 4,275,385 | 6/1981 | White | 340/312 |
| 4,538,029 | 8/1985 | Gazzoli et al. | 379/61 |
| 4,628,152 | 12/1986 | Åkerberg | 379/61 |
| 4,642,425 | 2/1987 | Guinn, Jr. et al. | 379/57 |
| 4,658,096 | 4/1987 | West, Jr. et al. | 379/59 |
| 4,672,657 | 6/1987 | Dershowitz | 379/63 |
| 4,680,785 | 7/1987 | Akiyama et al. | 379/57 |
| 4,682,367 | 7/1987 | Childress et al. | 455/17 |
| 4,731,812 | 3/1988 | Åkerberg | 379/61 |
| 4,747,122 | 5/1988 | Bhagat et al. | 379/57 |
| 4,748,655 | 5/1988 | Thrower et al. | 379/60 |

OTHER PUBLICATIONS

Auto Page Inc., Auto Page ® 4000M Instruction Manual (Undated).
AT&T Page Pac ® 20 Voice Paging System PowerMate ® Service Manual–Installation Issue 3, Jul. 1986.
Motorola Communications and Electronics Inc., Modax 100 On-Site Telephone Interconnected Radio Paging Termina. (brochure R3-5-74C, 1982).

Primary Examiner—Robert Lev
Attorney, Agent, or Firm—Gottlieb, Rackman & Reisman

[57] ABSTRACT

An apparatus for interfacing a telephone system having a central processor and a plurality of telephone extension lines operatively connected to the central processor to at least one pager transmitter. For each pager transmitter there is an interface circuit which is connected to one of the telephone extension lines and to one of the pager transmitters. The interface circuit includes a ring signal detector to detect activation of the telephone extension line connected thereto and for providing an output indicative of the activation. The interface circuit further includes a pager transmitter activator responsive to the output of the detector means for activating one of the pager transmitters.

13 Claims, 2 Drawing Sheets

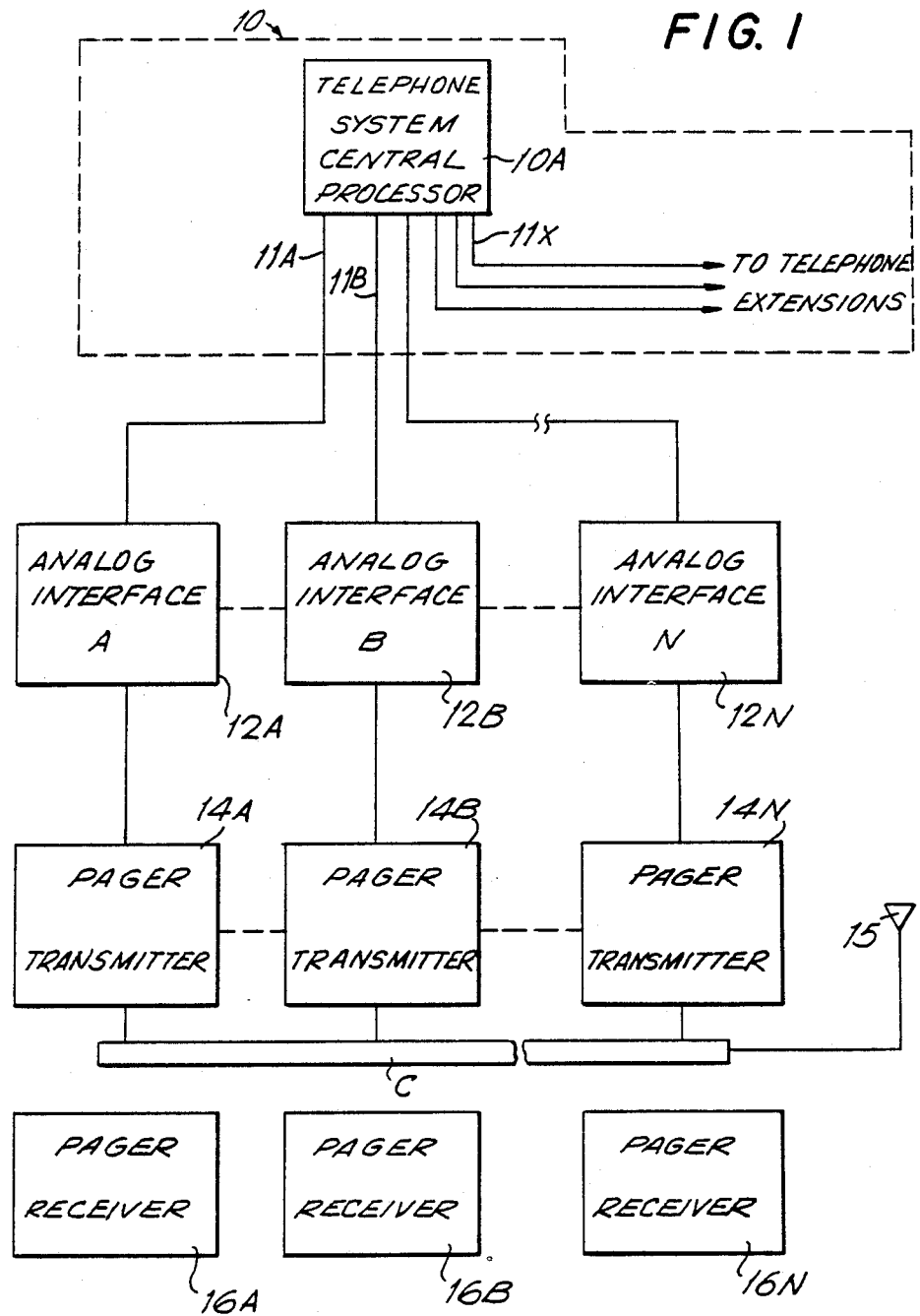

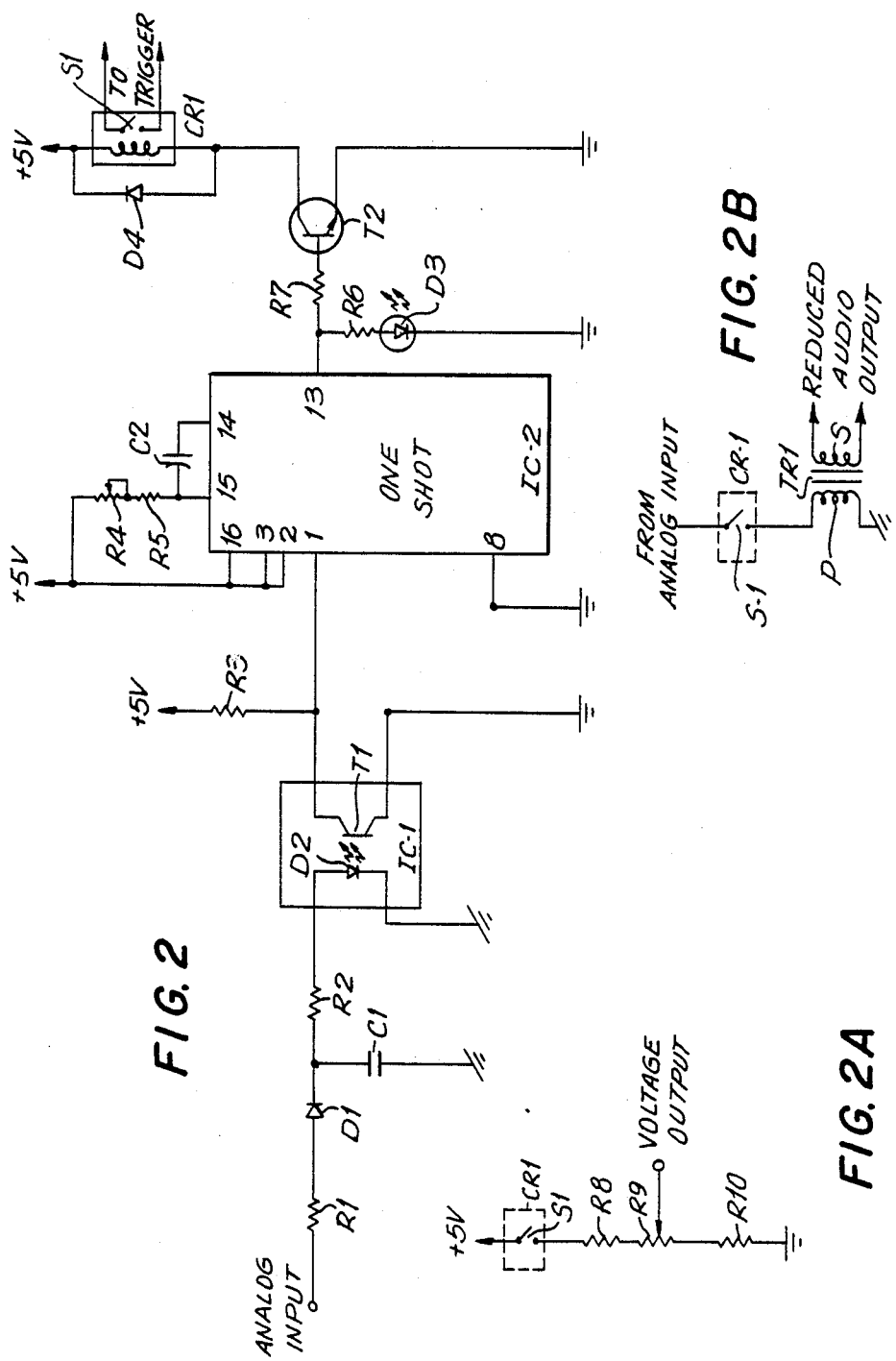

TELEPHONE SYSTEM/PAGING SYSTEM INTERFACE

BACKGROUND OF THE INVENTION

The present invention relates to paging systems. More particularly, it relates to an interface between existing telephone systems and pager transmitters.

A variety of paging systems useful in institutions such as hospitals, schools, industrial plants or large catering facilities use a manual dispatch operator When a telephone call is received the operator activates the appropriate transmitter to page a particular individual carrying a corresponding receiver Such systems are costly in terms of requiring attendance by an operator. Further, paging errors may be made, resulting in inordinate delays in paging and messages not reaching the intended recipient.

More recently automatic paging systems such as the Motorola MODAX® 100 On-Site Telephone Interconnected Radio Paging Terminal have become available. These types of systems connect to a standard telephone company trunk or selector level input via an interface for dial pulse operation. Thus, while these systems provide direct dialing of a pager, they are relatively complex and costly. Installation of one of these systems is comparable in cost and complexity to having an additional telephone system. Further, these systems are generally complex and use sophisticated digital signal processing.

Thus, a need exists for a simple, low cost approach to direct access paging through a telephone system.

DISCLOSURE OF THE INVENTION

It is a principle object of the invention to provide an inexpensive direct access paging system.

It is an additional object of the invention to provide a direct dial paging system which is simple and inexpensive.

It is a further object of the invention to provide an interface between a telephone system and a pager transmitter so as to provide direct access paging.

It is an additional object of the invention to provide an interface circuit between a telephone system and a pager transmitter which is comprised largely of analog components.

In accordance with the invention, an apparatus for interfacing a telephone system having a central processor and a plurality of telephone..extension lines operatively connected to the central processor to at least one pager transmitter, is provided. For each pager transmitter there is an interface circuit which is connected to one of the telephone extension lines and to one of the pager transmitters. The interface circuit includes a detection means to detect activation of the telephone extension line connected thereto and for providing an output indicative of the activation. The interface circuit further includes a pager transmitter activation means responsive to the output of the detection means for activating one of the pager transmitters.

BRIEF DESCRIPTION OF THE DRAWINGS

Further objects, features and advantages of the invention will become apparent upon consideration of the following detailed description in conjunction with the drawings, in which:

FIG. 1 is a block diagram of the apparatus according to invention in use in a direct access paging system;

FIG. 2 is a schematic diagram of the interface circuit used in FIG. 1;

FIG. 2A is a schematic diagram of a modification of the circuit of FIG. 2; and

FIG. 2B is a schematic diagram of an additional modification of the circuit of FIG. 2.

DETAILED DESCRIPTION OF THE PREFERRED EMBODIMENTS

FIG. 1 illustrates a direct access paging system according to the invention. A telephone system 10 includes a central processor 10A having telephone extension lines 11A, 11B . . . 11X operatively connected thereto. Telephone system 10 is preferably a modular expandable system such as one of the MERLIN® system sold by AT&T. The advantage of using a modular system is that while most of telephone extension lines 11A to 11X can be used for normal telephone service, some of the lines, such as the lines 11A to 11N can each be connected to a respective interface circuit 12A, 12B . . . 12N constructed in accordance with the invention. Such a modular, expandable system permits the addition of new telephone extension lines and additional telephone extensions, or pager transmitters in accordance with the principles of the invention, generally at moderate cost and without the need to replace the entire system for purposes of expansion. Further, the existing telephone system can be utilized without having to purchase a separate, expensive paging system.

Thus, in accordance with the invention, a number of telephone extension lines 11A to 11N are designated for pager operation. The remainder, in accordance with the usual arrangement for a telephone system, are used for telephone extensions (not shown) in the usual manner. It is preferable that telephone system 10 be one in which there is direct access dialing. Then, someone calling in over the telephone system from a remote location, if that person knows the proper extension number, can cause the telephone system central processor 10A to directly access one of the interface circuits 12A to 12N simply by dialing that number. In addition, anyone of the persons at the additional telephone extensions of telephone system 10 can cause telephone system central processor 10A to access one of the interface circuits 12A to 12N by dialing the proper extension number.

When one of interface circuits 12A to 12N is activated by an appropriate signal on the telephone extension line to which it is connected, as described in more detail below, the interface circuit causes the activation of a corresponding pager transmitters 14A to 14N. The radio frequency outputs of pager transmitter 14A to 14N can be all coupled together by a suitable radio frequency combiner C of a type well known in the art. The output of combiner C is connected to an antenna 15 which transmits the paging signal. As is well known in the art, each of pager transmitters 14A to 14N have a slightly different frequency of radio transmission, or carrying different tone modulation so that if desired, each pager transmitter 14A to 14N activates only one pager receiver 16A to 16N each carried by an individual to be paged. Alternatively, when it is desirable to page more than one individual, such as a team of individuals who must react quickly to a crisis situation, several of the pager receivers 16A to 16N may be activated by the same radio frequency or the same audio frequency modulation tone carried thereon.

Each pair of a pager transmitter 14A and pager receiver 16A may be a type AUTO PAGE ® 4000M system manufactured by Autopage, Inc. of Torrance, Calif.

Referring to FIG. 2, each interface circuit 12A to 12N receives the audio signal from the telephone extension line 11A to 11N to which it is connected as its analog input. This signal is the audio signal supplied by telephone systems central processor 10A which acts as a ring signal to the telephone extension. The signal is current limited by resister R1 and rectified by diode D1 to charge capacitor C1. When the voltage across capacitor C1 reaches a sufficiently high level, light emitting diode D2 in the electro-optic coupler IC-1 (preferably of type 4N38A) is fired by conduction through resistor R2. This causes light sensitive transistor T1 to conduct causing input pin 1 of IC-2 to go from from +5 volts to close to ground potential due to the voltage drop across resistor R3 when current is conducted therethrough.

One side of C1 and one side of D2 of IC-1 are each electrically connected to the telephone system audio ground, as represented by the ground symbol having diagonal lines. The remaining ground symbols having the conventional horizontal lines are interface circuit grounds. Thus, the present invention, by using IC-1, provides electrical isolation from the telephone system.

IC-2 is a monostable multivibrator, such as one half of a type 74123. When triggered by a low signal at pin 1, pin 13 goes high, and remains high for a period of time determined by a time constant defined by capacitor C2 between pins 14 and 15 of IC-2 and adjustable resistor R5 which is connected from pin 15 to the positive supply voltage. The values of C2, R4 and R5 are selected so that the period of time is adjustable between approximately 1.0 and 10 seconds.

When pin 13 is high, current is conducted through resistor R6 and light emitting diode D3, which may be positioned so as to provide a visual indication of the activation of the interface circuit. In addition, when pin 13 is high, transistor T2 is turned on by current conducted through resistor R7. Current is then conducted through the coil of relay CR1 closing normally-open contacts S1. Contacts S1 are connected to a respective pager transmitter. Closure of contacts S1 triggers the normally-open contacts on the pager transmitter causing it to transmit a paging signal. Diode D4 is provided for protection of transistor T2 when pin 13 returns to ground potential causing transistor T2 to stop conducting and inducing a potentially damaging transient voltage in the coil of relay CR1.

It will be understood that there may be pager transmitters which can be activated when transistor T2 becomes conductive, i.e. the path from the collector of transistor T2 to ground may be of low enough resistance In such cases, relay CR1 may be dispensed with, but there will be no electrical isolation between the pager transmitter and the interface circuit.

Referring to FIG. 2A, for those pager transmitters which are activated by the application of a DC voltage instead of by a closure of relay contacts, one of contacts S1 of relay CR1 is connected to the positive supply voltage while the other is connected to a string of series connected resistors R8, R9 and R10. One side of resistor R10 is connected to ground. Resistor R9 is preferably a potentiometer. Thus, when contacts S1 of relay CR1 are closed, a positive voltage, the magnitude of which is determined by the values of R8, R9 and R10 and the setting of the slider on resistor R9 is provided. This positive voltage may be used to activate one of the pager transmitters.

Contacts S1 of relay CR1 may be used to close an audio circuit including an L-pad or as shown in FIG. 2B an audio transformer. In FIG. 2B, one of contacts S1 is connected to the analog input of the interface circuit (FIG. 2), while the other is connected to one side of primary winding P of transformer TR1. The other side of primary winding P is connected to audio ground The secondary S of transformer TR1 provides an audio output signal, preferably of reduced voltage due to a suitable step down ratio of transformer TR1, to activate a pager transmitters requiring an audio signal at its activation input terminals.

Thus, as will be appreciated from the foregoing description, the present invention provides an inexpensive circuit for interfacing a pager to a telephone system. Direct access to a pager is provider without the use of complex and costly systems. Virtually all of the components used in the interface circuit are simple analog components and thus, the use of a costly digital or tone decoder interface to a telephone system is avoided. Further, the present invention, by making use of an electro-optical coupler, provides adequate electrical isolation between the telephone system and the paging system. The use of a coupler providing electrical isolation permits separate grounds to be used for the audio of the telephone system and that part of the interface circuit to the right of IC-1. In addition, the use of relay CR1 in FIG. 2 and transformer TR1 in FIG. 2B provides electrical isolation between the interface circuit and the pager transmitter.

Various modifications of the invention will occur to those skilled in the art after reading the above specification. For example, the audio or analog input signals from the telephone extension line may be coupled to the interface current with a transformer and the output of the secondary rectified, filtered and used as the input for activation of IC2.

Once a pager receiver in a paging system using the present invention has been activated, there are various possibilities for providing a message to the individual being paged. The most frequently used requires the person paged to dial a predetermined telephone number, or a predetermined extension (as for example, that of a telephone receptionist) in an institutional setting. This is consistent with the operation of many telephone systems in which, after a predetermined number of rings, the direct dialed incoming call is transferred to a receptionist or to a message center. The incoming call which activated the transmitter can then be transferred to the telephone extension being used by the person paged. Alternatively, the person being paged can activate a portable radio receiver to receive a message.

Although the invention has been described with reference to particular embodiment, it is to be understood that the embodiment is merely illustrative of the application of the principles of the invention. Numerous modifications may be made therein and other arrangements may be devised with departing from the spirit and scope of the invention.

I claim:

1. An apparatus for interfacing a telephone system having a central processor and a plurality of telephone extension lines operatively connected to said central processor to at least one pager transmitter, said apparatus comprising:

for each pager transmitter, an interface circuit connected to one of said telephone extension lines, and to one of said pager transmitters, said interface circuit having:
  (a) detection means to detect activation of a telephone extension line connected to said interface circuit and for providing an output indicative of activation; and
  (b) paging transmitter activation means responsive to the output of said detection means for activating one of the pager transmitters.

2. The apparatus of claim 1, wherein said detection means includes an electrical isolation means for electrically isolating said telephone system from said interface circuit.

3. The apparatus of claim 2, wherein said electrical isolation means is an electro-optical coupler.

4. The apparatus of claim 1, wherein said pager transmitter activation means includes a monostable multivibrator for providing a pulse in response to said output.

5. The apparatus of claim 4, wherein said activation means further comprises a relay responsive to said pulse, said relay being for electrical connection to said pager transmitter.

6. The apparatus of claim 4, wherein said relay includes a normally open conduction path, said path being closed to activate said pager transmitter.

7. The apparatus of claim 5, further comprising a voltage source and a voltage divider, said voltage source, said relay and said voltage divider being connected to provide a voltage to activate said pager transmitter.

8. The apparatus of claim 5, further comprising an audio source and an audio coupler, said audio source, said audio coupler and said relay being connected to provide an audio signal to activate said pager transmitter.

9. The apparatus of claim 8, wherein said audio coupler is an audio transformer.

10. The apparatus of claim 8, wherein said audio source is the telephone extension line connected to said interface circuit.

11. The apparatus of claim 1, wherein said interface circuit comprises substantially only analog components.

12. The apparatus of claim 1, in combination with
  (a) at least one pager transmitter connected to said interface current for activation by said transmitter activation means, and
  (b) at least one pager receiver for receiving signals from said at least one pager transmitter.

13. The combination of claim 12, further comprising said telephone system, at least one said extension line of said telephone system being operatively connected to at least one said interface circuit.

* * * * *